United States Patent

Dong

[11] Patent Number: 5,923,427
[45] Date of Patent: Jul. 13, 1999

[54] OPTICAL TRIANGULATION DISTANCE SENSING SYSTEM AND METHOD USING A POSITION SENSITIVE DETECTOR AND AN AUTOMATIC POWER CONTROLLED LIGHT SOURCE

[75] Inventor: Haozhe Dong, Plymouth, Minn.

[73] Assignee: Banner Engineering Corporation, Minneapolis, Minn.

[21] Appl. No.: 08/889,997

[22] Filed: Jul. 10, 1997

[51] Int. Cl.⁶ ..................................................... G01B 11/00
[52] U.S. Cl. .......................... 356/375; 356/3.04; 250/205; 250/559.31; 250/559.38
[58] Field of Search ..................................... 356/375, 376, 356/3.04; 250/205, 559.31, 559.38

[56] References Cited

U.S. PATENT DOCUMENTS

| | | | |
|---|---|---|---|
| 4,589,773 | 5/1986 | Ido et al. | 356/376 |
| 5,055,664 | 10/1991 | Ryczek | 250/201.4 |
| 5,644,141 | 7/1997 | Hooker et al. | 356/376 |

FOREIGN PATENT DOCUMENTS 57-44809 3/1982 Japan.
64-31412 2/1989 Japan.

*Primary Examiner*—F. L. Evans
*Attorney, Agent, or Firm*—Merchant, Gould, Smith, Edell, Welter & Schmidt, P.A.

[57] ABSTRACT

A distance sensing system employs an optical triangulation system and a position sensitive device (PSD). The PSD generates a pair of current signals when a target reflects light from a light source back to the surface of the PSD. An automatic power control circuit is used to keep one of the current signals a constant value. The position of the reflected light spot on the PSD is linearly proportional to the other current generated by the PSD according to the formula:

$$Y = C \times I2$$

Where Y is the spot position and C is a normalization constant. The signal I2 is processed to extract distance information relative to the target.

10 Claims, 4 Drawing Sheets

OPTICAL TRIANGULATION DISTANCE SENSING SYSTEM AND METHOD USING A POSITION SENSITIVE DETECTOR AND AN AUTOMATIC POWER CONTROLLED LIGHT SOURCE

FIELD OF THE INVENTION

The present invention relates generally to optical distance sensing and measurement. In particular, the present invention relates to an optical distance sensing system using a position sensitive photoreceiver.

BACKGROUND OF THE INVENTION

Distance sensing and other distance measurement related applications have been accomplished in the prior art optically utilizing the principles of triangulation. A simplified example of a utilization of the principle is illustrated in FIG. 1. A light source comprising a light emitting diode LED 10 emits a pulsed light beam that is collimated along its optical axis and directed toward a target or object T. With the target T at the position X1 from the LED 10 a portion of the pulsed light beam is reflected back to a photoreceiver means such as a position sensitive detector (PSD) 12 well known in the prior art. The reflected light beam strikes the surface of the position sensitive detector 12 at the position Y1. The PSD 12 converts the photon light energy striking the PSD into two electrical current signals I1 and I2 at two of its output terminals. The current signals I1 and I2 contain information relative to the position where the reflected light beam impinges upon the surface of the PSD. Accordingly, the current signals I1 and I2 contain information relating to the distance X1. When the position of the reflected light beam moves in a vertical direction as illustrated in FIG. 1, the difference between the signals I1 and I2 changes. With the target at the position X2, the position of the reflected light beam on the PSD is shown at Y2. The displacement between Y1 and Y2 corresponds to the difference between X1 and X2. It is known in the prior art to electronically process the changes of the current signals I1 and I2 to generate distance measurement related signals. The position Y of the light beam on the surface of the PSD satisfies the following equation:

$$Y = \frac{I1 - I2}{I1 + I2}$$

A common method to extract distance information from the currents I1 and I2 is to use this equation. To accomplish the signal division, straightforward approaches such as microprocessors with analog to digital (A/D) converters, analog dividers or logarithmic operational amplifier circuits are used. The prior art system design using a microprocessor is straightforward incorporating off the shelf electronic circuitry. The mathematical operations of division of the signals are performed with the microprocessor. The circuitry required for this implementation are microprocessors with analog to digital conversion. In the prior art analog devices have also been used to accomplish the same division function.

The currents I1 and I2 are usually small and the photon density or intensity of light striking the surface of the PSD varies with distance. Thus, complex electronic circuits are required for current amplifications and the electronic signal processing. Two factors in an optical triangulation system make the signal processing difficult. The first is the change of the magnitude of the currents I1 and I2 as a function of the distance between the LED and the target. The other is the surface reflectivity of the target. For example, with a low reflectivity target the photon density or light intensity impinging upon the surface of the PSD will be less than a high reflectivity target. The light intensity striking the PSD decreases dramatically as the target moves farther away from the LED and is approximately inversely proportional to the square of the distance between the PSD and the target at relatively far distances. The light intensity striking the PSD is never a constant value when the target moves along the optical axis. For a given distance between the PSD and the target, the reflected light striking the PSD is likely to vary according to the color of the target which affects the surface reflectivity.

Therefore the two current signals I1 and I2 contain more than just distance information. The signals also include the effective surface reflectivity from a target and light intensity changes at the PSD due to distance changes. Therefore, the simple difference between I1 and I2 is no longer the direct information of distance measurement. Because of the mixed information in the signals, the signal processing for extracting the distance measurement information is difficult.

Because of the change in the received light energy as a function of distance and the reflectivity of the target, the dynamic range of the current signals is large. The large dynamic range requires a high resolution A/D converter. Usually a high resolution A/D converter is relatively costly and has a slow response time. The high dynamic range also impacts amplifier design of the processing circuitry since the circuitry must be relatively noise free and operate with very low and very high levels of current. The use of analog dividers costs even more because of the requirement for the dynamic range characteristics and noise immunity. Analog dividers are, by their very nature, high gain devices where noise and stability are difficult to control.

Another prior art technique used instead of directly dividing the current signals from the PSD is the use of logarithmic operational amplifiers. These devices translate the dividing function into a straightforward subtraction method. But the necessary components for the logarithmic approach suffer from the linearity for the large dynamic range and performance drift with temperature variation.

Another approach to the signal processing is disclosed in U.S. Pat. No. 5,055,664. This patent discloses a ramp generator technique to normalize the denominator in the position equation. The technique disclosed in the '664 patent is an open loop solution requiring the concurrent monitoring of both electrical currents from the PSD. Response speed is limited with this approach.

Another prior art technique is disclosed in Japanese Patent laid-open No. 13412-1989. The technique disclosed in this prior art patent is to maintain the sum of I1 and I2 constant to normalize the denominator of the position equation noted above.

The present invention addresses the shortcomings of the prior art. The present invention eliminates the need for a microprocessor, analog divider or a logarithmic operational amplifier. It is a technique wherein one of the two current signals generated by the PSD is kept constant by regulating the intensity of the light emitted from the LED. The other current then contains the distance measurement information.

SUMMARY OF THE INVENTION

The present invention is an optical distance measuring system that includes a light source generating a light beam directed toward a target. The system has a photoelectric receiver means for receiving light reflected from the target and generating first and second signals according to the position of the reflected light on the receiver means. A control circuit means maintains one of the first and second signals constant by controlling the light output intensity of the light source. The system has a circuit means for processing the other of the first and second signals and generating a signal that represents distance information relative to the target.

In the preferred embodiment, the light source is a light emitting diode generating a pulse modulated light beam, preferably in the infrared range. The photoelectric receiver means is a PSD. One of the two current signals generated by the PSD, for example, I1 is kept constant by regulating the intensity of the light emitted from the light emitting diode. The intensity of the light from the light emitting diode in the preferred embodiment is regulated by an automatic power control circuit. The other current signal, for example, I2 represents distance information relative to the target.

In operation, the current signals I1 and I2 generated by the PSD are converted to voltage signals. The pulsed voltage signals are then changed to D.C. voltage signals by sample and hold circuits. The voltage signal representing I1 is compared by an integrator with a preset reference voltage and the integrator/comparator generates an output signal controlling an LED driver circuit. The D.C. voltage signal representing I2 is processed to provide an output representing the distance information.

The present invention offers the advantage that the LED is only driven as hard as necessary to maintain the light intensity output required to keep I1 constant. The present invention has the additional benefit of being able to be modulated much faster than prior art schemes. The invention is cost effective, has higher response speeds, and results in longer life of the LED devices when compared with existing prior art optical triangulation systems for distance sensing and measurement.

DETAILED DESCRIPTION OF THE PREFERRED EMBODIMENT

Figure 2:
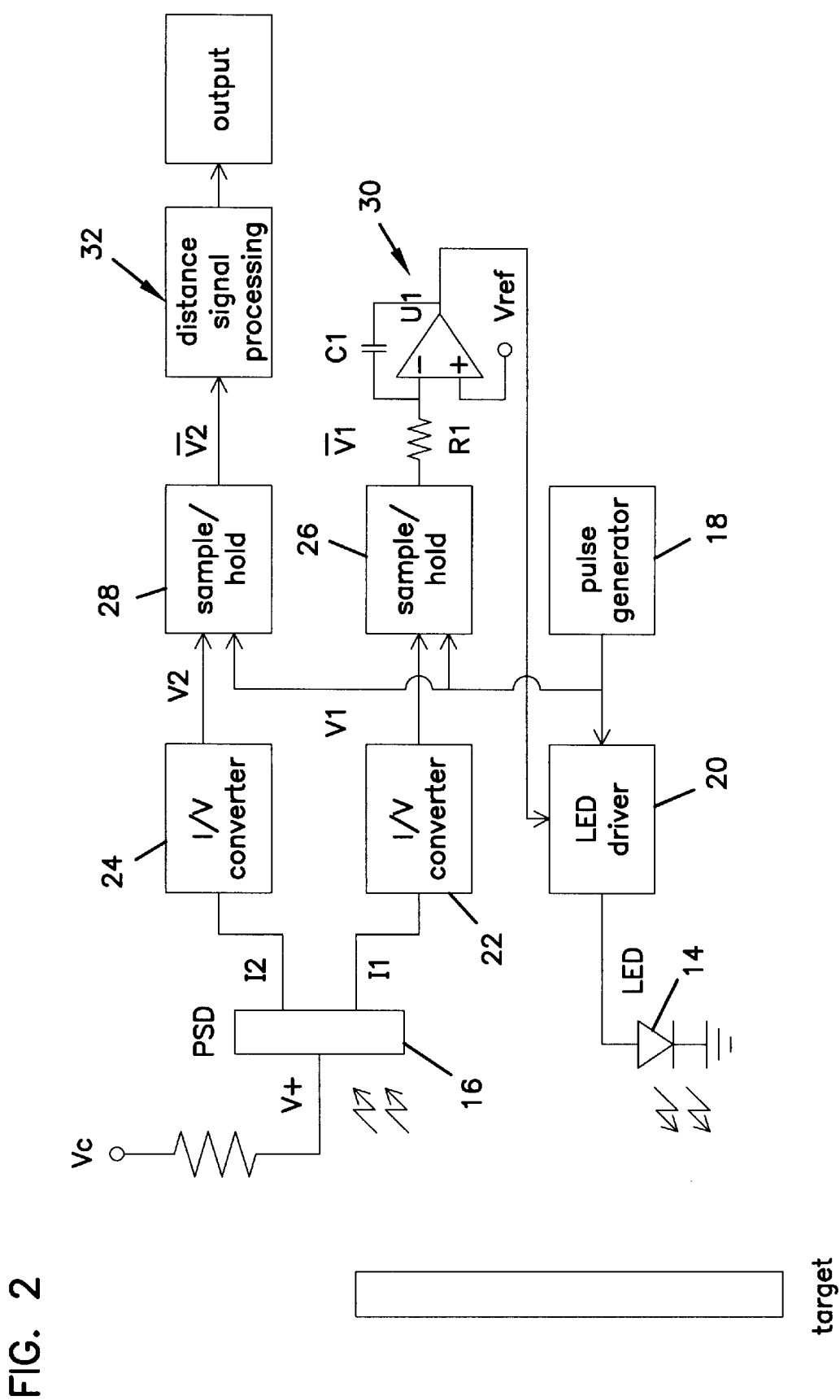
FIG. 2 is a block diagram representation of the present invention.

A preferred embodiment of the present invention is shown in block diagram form in FIG. 2. The system includes a light emitting diode LED 14 generating a pulse modulated light beam. In the preferred embodiment, LED 14 is a typical infrared semiconductor light emitting diode well known in the prior art. It should be understood that other light sources are also contemplated within the scope of the present invention. Examples of alternative light sources are laser diodes and even incandescent light provided the light is properly optically collimated. The emitted light from LED 14 is partially reflected from a target to a photoelectric receiver means which in the preferred embodiment is a position sensitive detector PSD 16. A suitable PSD is available from HAMAMATSU part number S4584. A pulse generator circuit 18 generates a pulse signal input to a LED driver circuit 20. The output light intensity of LED 14 is regulated by the LED driver circuit 20 as will be described in more detail later. The light emitted from LED 14 is a pulse modulated infrared signal.

PSD 16 generates current signals I1 and I2 which are pulsed current signals. As previously described, the magnitude of the signals I1 and I2 depends upon the position of the reflected light on the PSD 16. The pulsed current signal I1 is converted to a pulsed voltage signal V1 by a current to voltage converter circuit 22. Similarly, the pulsed current signal I2 is converted to a pulsed voltage signal V2 by a current to voltage converter circuit 24. The pulsed voltage signals V1 and V2 are then converted to D.C. voltage signals $\overline{V1}$ and $\overline{V2}$ by sample and hold circuits 26 and 28, respectively. Sample and hold circuits 26 and 28 are synchronized with pulse generator 18 to sample the pulsed voltage signals V1 and V2 upon occurrence of each light pulse from LED 14. D.C. voltage signal $\overline{V1}$ is the input signal to an integrator circuit designated generally at 30 which include an operational amplifier U1, capacitor C1 and resistor R6. The other input to integrator circuit 30 is a predetermined reference voltage $V_{ref}$. The D.C. voltage $\overline{V1}$ is compared with the $V_{ref}$ and the output of integrator circuit 30 varies inversely with changes in the amplitude of $\overline{V1}$. When $\overline{V1}$ is high, the output voltage of integrator circuit 30 is low. The low output reduces the driving current to LED 14. Conversely, when $\overline{V1}$ is low, the output of integrator circuit 30 is high, increasing the LED driving current. In this manner, the LED output light intensity is regulated to maintain the pulsed current signal I1 constant.

The D.C. signal $\overline{V2}$ is processed by a distance signal processing circuit 32 in a manner well known in the prior art. Distance signal processing circuit 32 generates an output representative of the distance to the target. By maintaining the signal I1 constant, the position of the reflected light beam on PSD 16 is linearly proportional to the current I2, represented by the formula:

$$Y = C \times I2$$

Where Y is the spot position and C is a normalization constant. Thus, the information relating to the distance to the target is wholly contained within the signal I2.

Figure 3:
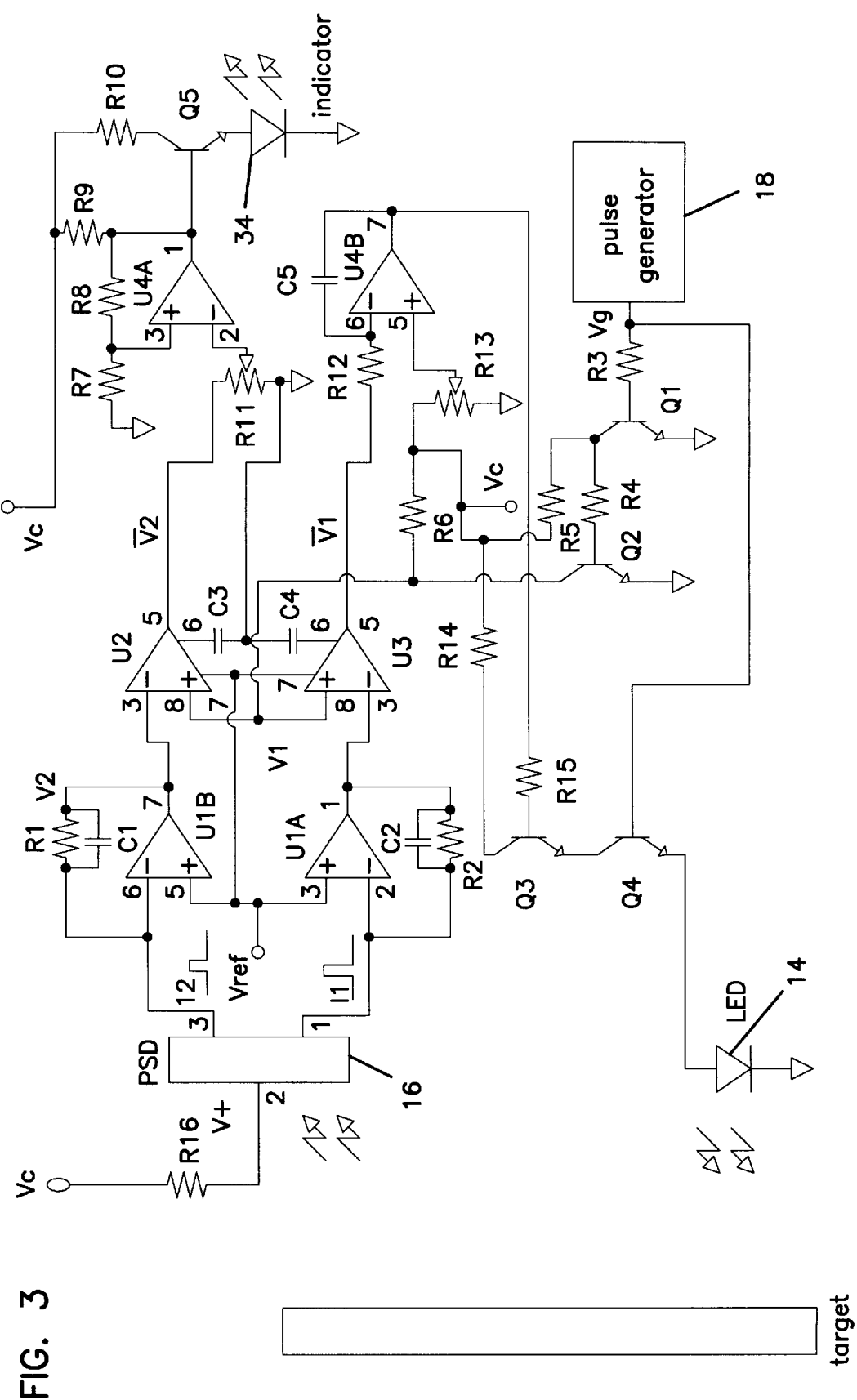
FIG. 3 is a circuit schematic of the present invention.

A preferred embodiment of the present invention is shown in more detail in the electrical schematic of FIG. 3. Pulse generator circuit 18 produces 0–5 V voltage pulses, Vg shown in FIG. 4. The signal Vg is used to modulate LED 14 and synchronize sample and hold circuits 26 and 28. Signal Vg modulates the output of LED 14 through a transistor Q4 which performs as a digital switch for LED 14. A resistor R14 is a current limiting resistor connected to the D.C. supply voltage Vc and limits the maximum current through LED 14. A transistor Q3 functions as a variable resistor controlled by the output voltage signal from integrator circuit 30 and, in particular, the voltage output signal of operational amplifier U4B which corresponds to operational amplifier U1 of FIG. 2. The output signal from operational amplifier U4B is connected to the base of transistor Q3 through resistor R15. Transistor Q3 determines the driving current through LED 14. The LED driving current signal is shown in the timing diagram of FIG. 4 as $I_{LED}$.

Figure 1:
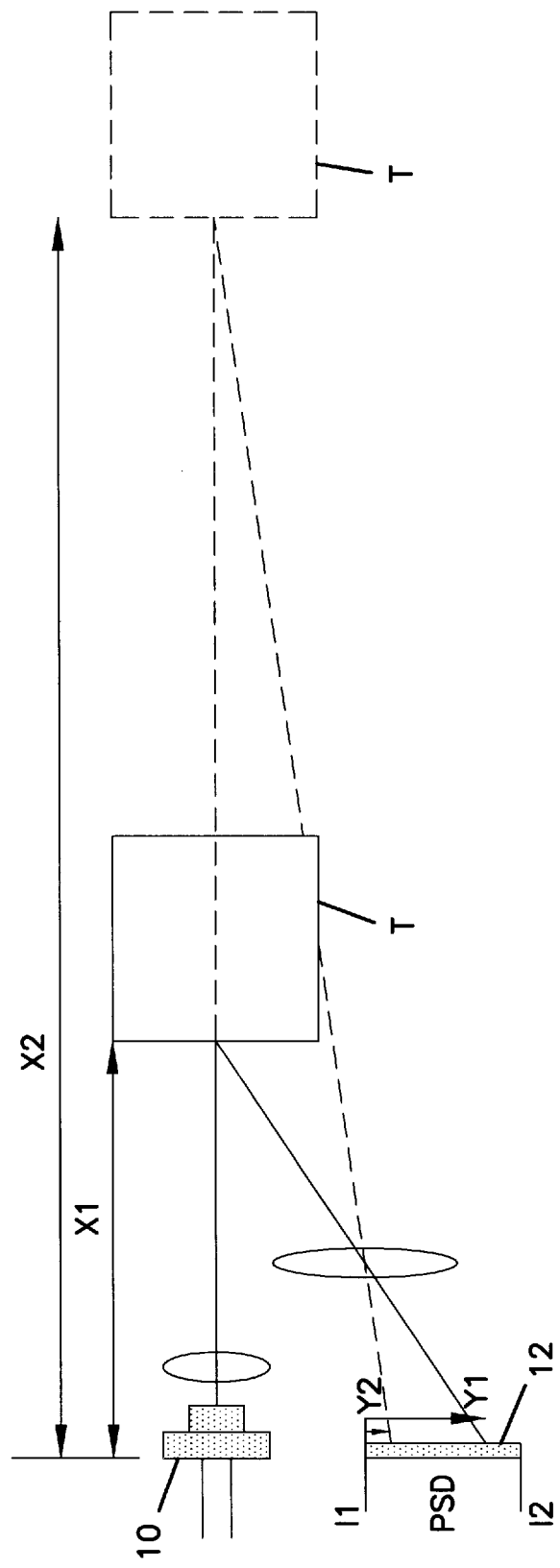
FIG. 1 is a prior art distance sensing system using optical triangulation incorporating a PSD.
Figure 4:
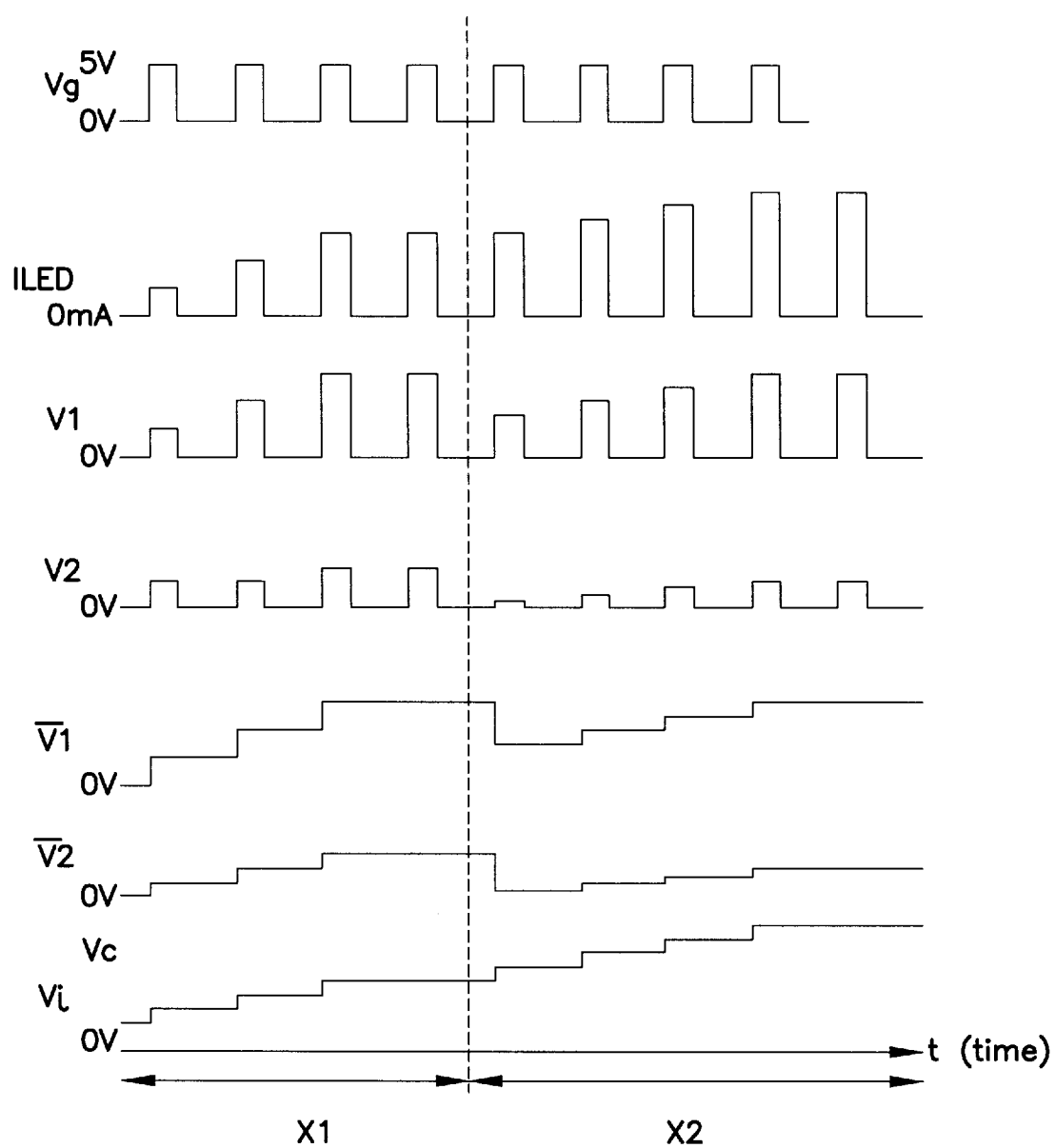
FIG. 4 is a waveform timing diagram illustrating the operation of the invention shown in FIGS. 2 and 3 and depicts signals with a target at two different distances.

The emitted light beam from LED 14 is partially reflected back to PSD 16 by a target through optical triangulation as shown in FIG. 1. PSD 16 generates pulsed electrical current signals I1 and I2. Current to voltage converter circuits 22 and 24 are well known in the prior art and comprise an operational amplifier U1A, resistor R2, capacitor C2 and operational amplifier U1B, resistor R1 and capacitor C1, respectively. The operational amplifiers U1A and U1B may be off the shelf components such as a Motorola LM833. Resistors R1 and R2 are feedback resistors that determine the gain of the amplifier and capacitors C1 and C2 determine bandwidth as well known in the prior art. A reference voltage $V_{ref}$ is used to set the D.C. voltage level for signals V1 and V2. The current signals, I1 and I2 are converted to electrical voltage signals V1 and V2 as shown in FIG. 4. The peak of the voltage pulses of the signals V1 and V2 contain the distance measurement information. Sample and hold circuits 26 and 28 are conventional prior art integrated circuits, for example, from Linear Technology, part number LF398. As shown in FIG. 3, sample and hold circuits 26 and 28 comprise operational amplifiers U2 and U3 and charge holding capacitors C3 and C4. Sample and hold circuits 26 and 28 are synchronized by clock pulses from pulse generator 18 through pin 8. Transistors Q1 and Q2 and resistors R3, R4, R5 and R6 create negative pulses to trigger sample and hold circuits 26 and 28. The output of U3 is a D.C. voltage representing the peak value of the pulsed voltage signal $\overline{V1}$ and is illustrated in FIG. 4 as $\overline{V1}$. The output of U2 is also a D.C. voltage representing the peak value of the pulsed voltage signal V2 and is shown in FIG. 4 as $\overline{V2}$. The signal $\overline{V1}$ is the input to integrator circuit 30 that consists of operational amplifier U4B, resistor R12, resistor R13 and capacitor C5. Resistor R13 is adjustable to provide a voltage reference for controlling the amplitude of the signal $\overline{V1}$. Capacitor C5 and resistor R12 determine the RC time constant of the integrator. The signal $\overline{V1}$ is compared with the reference voltage. The output of integrator circuit 30, as stated above, inversely varies with the change in $\overline{V1}$. If $\overline{V1}$ is less than the reference voltage, the output voltage is high increasing the base current of transistor Q3. The output voltage signal from U4B is illustrated in FIG. 4 as Vi. Increasing the base current of transistor Q3 increases the driving current to the LED 14 generating increased light intensity from LED 14. As a consequence, both the current signals I1 and I2 increase resulting in increasing voltage signals $\overline{V1}$ and $\overline{V2}$. If the signal $\overline{V1}$ is higher than the reference voltage input to U4B, the output Vi decreases thereby decreasing the base current of Q3 and consequently decreasing the output intensity of LED 14. Therefore, the output intensity of LED 14 is automatically adjusted to maintain the voltage signal $\overline{V1}$ and current signal I1 constant.

The voltage signal $\overline{V2}$ output from U2 is the input to a comparator consisting of amplifier U4A, resistor R7, resistor R8, resistor R9 and resistor R11. Resistor R7 and R8 establish a reference voltage and feedback ratio. Resistor R9 establishes the load current. Resistor R11 is adjustable to regulate the input signal from U2. When the input voltage $\overline{V2}$ is lower than the preset reference voltage, the output of comparator U4 is high. When the output is high, transistor Q5 is turned on providing a visual indication through a light emitting diode LED 34. Resistor R10 is a current limiting resistor. By adjusting the value of resistor R11, the user can set the system to sense a target at any position within the range of the system. It should be understood that the distance information represented by the signal $\overline{V2}$ can be processed by any well known means to extract distance information. Such well known signal processing means could result in an output that provides a specific distance measurement, for example, or whether or not the target is within the range of distance selected by the user.

FIG. 4 illustrates a signal timing diagram and shows in particular the operation of the system of the present invention with changes in distance to the target. When the distance to the target increases from X1 to X2, the driving current $I_{LED}$ to LED 14 increases, resulting in higher light intensity output directed toward the target object. The increased light intensity functions to keep the signal I1 constant. Accordingly, as shown in FIG. 4, regardless of the distance to the target the maximum amplitude of the voltage signal V1 is held constant and the voltage signal $\overline{V1}$ remains constant. The current signal I2, the pulsed voltage signal V2, and D.C. voltage signal $\overline{V2}$ does change with a change in distance to the target as show in FIG. 4. For example, at the greater distance X2, the signal $\overline{V2}$ is less than at X1. This signal, as previously described, is the signal that is processed to extract the target distance information. A timing diagram showing the signal characteristics of the system with a change in surface reflectivity of the object would look similar to that shown in FIG. 4. In summary, the optical distance sensing system of the present invention automatically adjust the light output intensity to hold constant one of the signals generated by reflected light on the position sensitive photoreceiver regardless of the distance to the target and/or the target surface reflectivity. This is a closed loop automatic adjustment of the LED light intensity. The LED is driven only as hard as necessary to maintain the constant signal level. The system of the present invention can be modulated much faster than prior art schemes. The present invention also offers the advantage of being cost effective, having a higher response speed and resulting in longer life of the LED devices due to the reduced current drive requirements compared with prior art solutions.

I claim:

1. An optical distance sensing system comprising:
    a light source generating a light beam directed toward a target;
    a photoelectric receiver means for receiving light reflected from the target, said photoelectric receiver means generating first and second signals according to the position of said reflected light on said photoelectric receiver means along a single spatial axis;
    control circuit means for maintaining one of said first and second signals constant by controlling the light output intensity of said light source;
    circuit means for processing the other of said first and second signals and generating a signal representing distance information relative to the target.

2. An optical distance sensing system in accordance with claim 1 wherein said light source further comprises a light emitting diode generating a pulse modulated light beam.

3. An optical distance sensing system in accordance with claim 2 wherein said control circuit means further comprises an integrator means for comparing said one of said first and second signals with a predetermined reference signal and generating a control signal to regulate the pulsed light output intensity of said light emitting diode.

4. An optical distance sensing system in accordance with claim 3 wherein said photoelectric receiver means further comprises a position sensitive detector and wherein said first and second signal are pulsed current signals.

5. An optical distance sensing system in accordance with claim 4 further comprising a signal processing circuit means for converting said pulsed current signals into D.C. voltage signals.

6. An optical distance sensing system in accordance with claim 5 wherein said control circuit means further comprises a light emitting diode driver circuit controlling the pulsed light output intensity of said light emitting diode.

7. An optical distance sensing system in accordance with claim 6 wherein said control circuit means further comprises an integrator means for comparing said one of said first and second D.C. voltage signals with a predetermined reference signal and generating a control signal input to said light emitting diode driver circuit to adjust the pulse light output intensity.

8. An optical distance sensing system in accordance with claim 7 wherein said signal processing circuit means further comprises first and second current to voltage circuits converting said first and second pulsed current signals into first and second pulsed voltage signals and first and second circuit means for sampling and holding said first and second pulsed voltage signals with each pulse from said light emitting diode to generate first and second D.C. voltage signals.

9. An optical sensing system comprising:
- a light emitting diode generating a pulse modulated light beam;
- a photoelectric receiver means for receiving said pulsed light reflected from a target, said photoelectric receiver means generating first and second pulsed current signals according to the position of said reflected light on said photoelectric receiver means along a single spatial axis;
- a first current to voltage circuit converting said pulsed current signal to a first pulsed voltage signal;
- a second current to voltage circuit converting said second pulsed current signal to a second pulsed voltage signal;
- a first circuit means for sampling and holding said first pulsed voltage signal with each light pulse from said light emitting diode to generate a first D.C. voltage signal;
- a second circuit means for sampling and holding said second pulsed voltage signal with each light pulse from said light emitting diode to generate a second D.C. voltage signal;
- a light emitting diode driver circuit controlling the pulsed light output intensity of said light emitting diode;
- an integrator circuit means for comparing said first D.C. voltage signal with a predetermined reference signal and generating a control signal to said light emitting diode driver circuit to adjust the pulsed light output intensity of the light emitting diode so that said first D.C. voltage signal remains constant;
- circuit means for processing said second D.C. voltage signal and generating a signal representing distance relative to the target.

10. A method of optically sensing distance relative to a target comprising the steps of:
- directing a light beam toward the target;
- positioning a photoelectric receiver means in the path of light reflected from the target for generating first and second signals according to the position of the reflected light on the photoelectric receiver means along a single spatial axis;
- controlling the light beam intensity so that one of the first and second signals is constant;
- processing the other of the first and second signals to obtain the information representing distance relative to the target.

* * * * *